(12) United States Patent
Ahn et al.

(10) Patent No.: US 11,852,908 B2
(45) Date of Patent: Dec. 26, 2023

(54) FLEXIBLE ELECTROCHROMIC DEVICE

(71) Applicant: SKC CO., LTD., Gyeonggi-do (KR)

(72) Inventors: Byeong Uk Ahn, Gyeonggi-do (KR);
Yong Sang La, Gyeonggi-do (KR);
Seong Hwan Lee, Gyeonggi-do (KR);
Il Hwan Yoo, Gyeonggi-do (KR);
Seung Bae Oh, Gyeonggi-do (KR)

(73) Assignee: SKC CO., LTD., Gyeonggi-Do (KR)

( * ) Notice: Subject to any disclaimer, the term of this patent is extended or adjusted under 35 U.S.C. 154(b) by 123 days.

(21) Appl. No.: 17/340,616

(22) Filed: Jun. 7, 2021

(65) Prior Publication Data

US 2021/0382342 A1 Dec. 9, 2021

(30) Foreign Application Priority Data

Jun. 9, 2020 (KR) .................. 10-2020-0069913

(51) Int. Cl.
| | | |
|---|---|---|
| *G02F 1/1333* | (2006.01) | |
| *G02F 1/155* | (2006.01) | |
| *G02F 1/153* | (2006.01) | |
| *E06B 9/24* | (2006.01) | |

(52) U.S. Cl.
CPC ............ *G02F 1/1333* (2013.01); *G02F 1/153* (2013.01); *G02F 1/155* (2013.01); *E06B 9/24* (2013.01); *E06B 2009/2464* (2013.01); *G02F 1/133305* (2013.01); *G02F 1/1533* (2013.01); *G02F 2203/01* (2013.01)

(58) Field of Classification Search
CPC ......... G02F 1/1333; G02F 1/153; G02F 1/155
See application file for complete search history.

(56) References Cited

U.S. PATENT DOCUMENTS

| | | | |
|---|---|---|---|
| 2010/0112270 A1 | 5/2010 | Bullard et al. | |
| 2011/0299149 A1* | 12/2011 | Park ...................... | G02F 1/1525 359/275 |
| 2019/0219881 A1* | 7/2019 | Shrivastava .......... | G02F 1/1533 |

FOREIGN PATENT DOCUMENTS

| | | |
|---|---|---|
| KR | 10-2010-0048035 A | 5/2010 |
| KR | 10-2017-0112247 A | 10/2017 |
| KR | 10-1862200 B1 | 7/2018 |
| KR | 10-2019-0071941 A | 6/2019 |

* cited by examiner

*Primary Examiner* — Dung T Nguyen
(74) *Attorney, Agent, or Firm* — IP & T GROUP LLP

(57) ABSTRACT

The embodiments relate to an electrochromic device having flexibility while achieving an excellent light transmission variable function based on the electrochromic principle. The flexible electrochromic device comprises a first base layer; a first barrier layer on the first base layer; a light transmission variable structure on the first barrier layer; a second barrier layer on the light transmission variable structure; and a second base layer on the second barrier layer.

7 Claims, 3 Drawing Sheets

FLEXIBLE ELECTROCHROMIC DEVICE

The present application claims priority of Korean patent application number 10-2020-0069913 filed on Jun. 9, 2020. The disclosure of each of the foregoing applications is incorporated herein by reference in its entirety.

TECHNICAL FIELD

Embodiments relate to an electrochromic device having flexibility while achieving an excellent light transmission variable function based on the electrochromic principle.

BACKGROUND ART

In recent years, as interest in environmental protection has increased, interest in technologies that enhance energy efficiency is also increasing. As an example, research and development on technologies such as smart windows and energy harvesting are being actively conducted. A smart window among them refers to an active control technology that adjusts the degree of transmission of light coming from the outside to enhance energy efficiency and to provide a pleasant environment to the users. It is a fundamental technology that can be commonly applied to various industrial fields. A smart window is based on electrochromism. Electrochromism is a phenomenon in which an electrochemical oxidation or reduction reaction takes place as electric power is applied, and an inherent color or optical properties such as light transmittance of an electrochromically active material are changed accordingly.

Currently, a glass-type smart window is generally used in which an electrochromic device is applied between several sheets of glass. However, its manufacturing process is complicated, and the product price is very high since the size of the product is to be tailored to the size of a window to be constructed, so that there are difficulties in commercializing it. In addition, there are also problems in that if a silicone finish is applied, moisture may penetrate, resulting in a risk of a short circuit, that it occupies a lot of storage space during logistics transportation, and that it is fragile to external impact and thus dangerous due to the nature of the material.

Thus, there has been a continuous demand for research on a smart window that is capable of solving the above problems and achieving an excellent light transmission variable function.

PRIOR ART DOCUMENT (Patent Document 1) Korean Patent No. 1862200 (May 23, 2018)

DISCLOSURE OF INVENTION

Technical Problem

The embodiments aim to provide an electrochromic device having flexibility while achieving an excellent light transmission variable function based on the electrochromic principle.

Solution to the Problem

The flexible electrochromic device according to an embodiment comprises a first base layer; a first barrier layer on the first base layer; a light transmission variable structure on the first barrier layer; a second barrier layer on the light transmission variable structure; and a second base layer on the second barrier layer.

Advantageous Effects of Invention

The flexible electrochromic device according to the embodiment achieves an excellent light transmission variable function based on the electrochromic principle while securing mechanical properties with flexibility. Thus, it is possible to overcome the limitations that it had to be applied only in a firm structure in the prior art and to secure a desired technical means simply by attaching it to a structure such as a conventional transparent window.

Specifically, the flexible electrochromic device has a characteristic that the light transmittance is reversibly changed when electricity is applied. Thus, it is possible to selectively control the transmittance of sunlight and the like with such a simple operation as pressing a button, whereby the energy efficiency can be enhanced.

In addition, it can be easily cut and attached to fit various window sizes. It can be applied to curved windows without deteriorating the performance by virtue of its flexible characteristics, resulting in excellent workability. It can be stored in a roll form, thereby reducing logistics costs. It is convenient to store and transport.

[Explanation of Reference Numerals]

| | |
|---|---|
| A-A': cutting line | 10: window |
| 100: flexible electrochromic device | 110: first base layer |
| 111: first-A primer layer | 112: first-B primer layer |
| 120: first barrier layer | 121: first-A barrier layer |
| 122: first-B barrier layer | 123: first-C barrier layer |
| 130: light transmission variable structure | 131: first electrode layer |
| 133: first chromic layer | 135: electrolyte layer |
| 137: second chromic layer | 139: second electrode layer |
| 140: second barrier layer | 141: second-A barrier layer |
| 142: second-B barrier layer | 143: second-C barrier layer |
| 150: second base layer | 151: second-A primer layer |
| 152: second-B primer layer | 160: release film layer |
| 161: adhesive layer | 170: hard coat layer |

BEST MODE FOR CARRYING OUT THE INVENTION

Hereinafter, the embodiments will be described in detail with reference to the accompanying drawings so that those of ordinary skill in the art to which the present invention pertains can easily practice them. However, the embodiments may be implemented in various different forms and are not limited to the embodiments described in the present specification.

In the present specification, in the case where each film, window, panel, structure, or layer is mentioned to be formed "on" or "under" another film, window, panel, structure, or layer, it means not only that one element is directly formed on or under another element, but also that one element is indirectly formed on or under another element with other element(s) interposed between them.

In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is understood to encompass a singular or plural expression, interpreted in context, unless otherwise specified.

In addition, all numbers and expressions relating to quantities of components, reaction conditions, and the like used herein are to be understood as being modified by the term "about" unless specifically stated otherwise.

Throughout the present specification, the terms first, second, and the like are used to describe various components. But the components should not be limited by the terms. The terms are used for the purpose of distinguishing one component from another.

Electrochromic Device

The embodiments provide a flexible electrochromic device having flexibility while achieving an excellent light transmission variable function based on the electrochromic principle.

Figure 3:
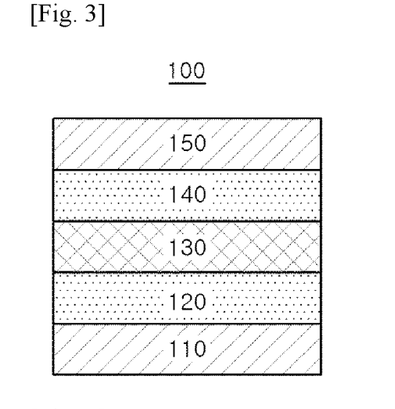
FIG. 3 schematically shows a cross-section of a flexible electrochromic device according to an embodiment.

The flexible electrochromic device (100) according to an embodiment comprises a first base layer (110); a first barrier layer (120) on the first base layer (100); a light transmission variable structure (130) on the first barrier layer (120); a second barrier layer (140) on the light transmission variable structure (130); and a second base layer (150) on the second barrier layer (140) (see FIG. 3).

Base Layer

The first base layer and the second base layer are layers for maintaining transparency and durability and comprise a polymer resin.

Specifically, the first base layer and the second base layer each comprise at least one selected from the group consisting of a polyester-based resin, an acrylic-based resin, a polyolefin-based resin, and combinations thereof.

For example, the first base layer and the second base layer may each comprise polyethylene terephthalate (PET), polyethylene naphthalate (PEN), or polycarbonate (PC), but they are not limited thereto.

As another example, the first base layer and the second base layer may each comprise polyethylene terephthalate (PET).

As the first base layer and the second base layer comprise the polymer resin described above, it is possible to achieve a flexible electrochromic device having both durability and flexibility.

The first base layer and the second base layer each have a light transmittance of 80% or more for light having a wavelength of 550 nm. Specifically, the first base layer and the second base layer may each have a light transmittance of 85% or more or 90% or more for light having a wavelength of 550 nm.

In addition, the first base layer and the second base layer may each have a haze of 2.0% or less, 1.8% or less, or 1.5% or less.

As the first base layer and the second base layer each satisfy a light transmittance and a haze in the above ranges, transparency can be attained.

The first base layer may have a thickness of 10 μm to 300 μm.

Specifically, the thickness of the first base layer may be 10 μm to 250 μm, 10 μm to 200 μm, 20 μm to 250 μm, 20 μm to 200 μm, 25 μm to 200 μm, or 25 μm to 188 μm, but it is not limited thereto.

The second base layer may have a thickness of 10 μm to 300 μm.

Specifically, the thickness of the second base layer may be 10 μm to 250 μm, 10 μm to 200 μm, 20 μm to 250 μm, 20 μm to 200 μm, 25 μm to 200 μm, or 25 μm to 188 μm, but it is not limited thereto.

As the first base layer and the second base layer satisfy a thickness within the above range, it is possible to achieve a thin, lightweight, and flexible electrochromic device, and it is advantageous for being made thin.

Barrier Layer

The barrier layers (the first barrier layer and the second barrier layer) serve to prevent the penetration of impurities including moisture or gas into the light transmission variable structure from the outside.

The first barrier layer (120) may comprise two or more layers. Specifically, the first barrier layer (120) may comprise two layers or three layers (see FIG. 5).

The second barrier layer (140) may comprise two or more layers. Specifically, the second barrier layer (140) may comprise two layers or three layers (see FIG. 5).

In an embodiment, the first barrier layer (120) may comprise two layers, and the second barrier layer (140) may comprise two layers.

In another embodiment, the first barrier layer (120) may comprise three layers, and the second barrier layer (140) may comprise three layers.

Figure 5:
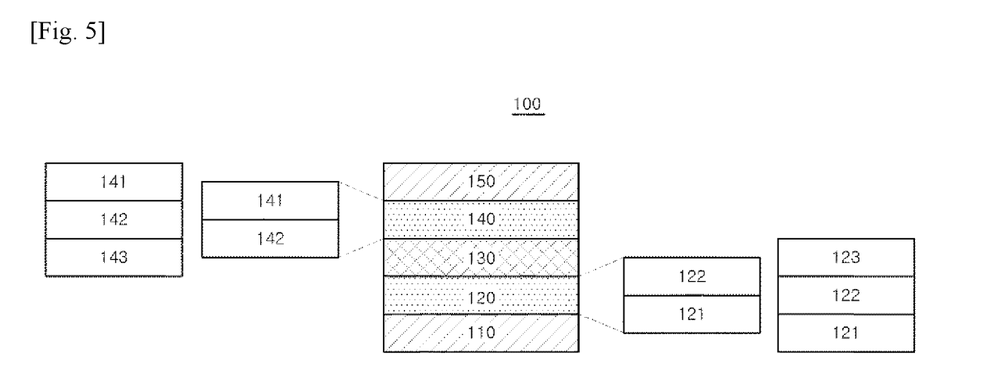
FIG. 5 schematically shows a cross-section of a flexible electrochromic device and a barrier layer according to an embodiment.

The first barrier layer (120) may comprise a first-A barrier layer (121) and a first-B barrier layer (122), or the first barrier layer may comprise a first-A barrier layer (121), a first-B barrier layer (122), and a first-C barrier layer (123) (see FIG. 5).

Specifically, the first barrier layer may have a structure in which a first-A barrier layer and a first-B barrier layer are sequentially laminated; or a structure in which a first-A barrier layer, a first-B barrier layer, and a first-C barrier layer are sequentially laminated.

The first barrier layer may be laminated on the first base layer.

The second barrier layer (140) may comprise a second-A barrier layer (141) and a second-B barrier layer (142), or the second barrier layer may comprise a second-A barrier layer (141), a second-B barrier layer (142), and a second-C barrier layer (143) (see FIG. 5).

Specifically, the second barrier layer may have a structure in which a second-A barrier layer and a second-B barrier layer are sequentially laminated; or a structure in which a second-A barrier layer, a second-B barrier layer, and a second-C barrier layer are sequentially laminated.

The second barrier layer may be laminated under the second base layer.

In an embodiment, the first barrier layer (120) may comprise a first-A barrier layer (121) and a first-B barrier layer (122), and the second barrier layer (140) may comprise a second-A barrier layer (141) and a second-B barrier layer (142). Alternatively, the first barrier layer (120) may comprise a first-A barrier layer (121), a first-B barrier layer (122), and a first-C barrier layer (123), and the second barrier layer (140) may comprise a second-A barrier layer (141) and a second-B barrier layer (142).

The first barrier layer (120) comprises at least one selected from the group consisting of metal oxides, metal nitrides, metal oxynitrides, metalloid oxides, metalloid nitrides, metalloid oxynitrides, and combinations thereof.

Specifically, the first barrier layer (120) comprises at least one selected from the group consisting of metal nitrides, metal oxynitrides, metalloid nitrides, metalloid oxynitrides, and combinations thereof. More specifically, the first barrier layer (120) comprises a metal nitride or a metalloid nitride.

In addition, the second barrier layer (140) comprises at least one selected from the group consisting of metal oxides, metal nitrides, metal oxynitrides, metalloid oxides, metalloid nitrides, metalloid oxynitrides, and combinations thereof.

Specifically, the second barrier layer (140) comprises at least one selected from the group consisting of metal nitrides, metal oxynitrides, metalloid nitrides, metalloid oxynitrides, and combinations thereof. More specifically, the second barrier layer (140) comprises a metal nitride or a metalloid nitride.

In an embodiment, the first barrier layer (120) may comprise a first-A barrier layer (121) and a first-B barrier layer (122), wherein one of the first-A barrier layer and the first-B barrier layer may comprise a metal oxide or a metalloid oxide, and the other may comprise a metal nitride or a metalloid nitride.

The first barrier layer (120) may further comprise a first-C barrier layer (123). In such a case, the first-C barrier layer may comprise an acrylic-based resin, an epoxy-based resin, a silicone-based resin, a polyimide-based resin, or a polyurethane-based resin.

In addition, the second barrier layer (140) may comprise a second-A barrier layer (141) and a second-B barrier layer (142), wherein one of the second-A barrier layer and the second-B barrier layer may comprise a metal oxide or a metalloid oxide, and the other may comprise a metal nitride or a metalloid nitride.

The second barrier layer (140) may further comprise a second-C barrier layer (143). In such a case, the second-C barrier layer may comprise an acrylic-based resin, an epoxy-based resin, a silicone-based resin, a polyimide-based resin, or a polyurethane-based resin.

In another embodiment, the first barrier layer comprises a first-A barrier layer and a first-B barrier layer, wherein the thickness ratio of the first-A barrier layer and the first-B barrier layer is 1:2 to 1:10. In such a case, the first-A barrier layer comprises a metal nitride or a metalloid nitride, and the first-B barrier layer comprises a metal oxide or a metalloid oxide.

The thickness ratio of the first-A barrier layer and the first-B barrier layer may be 1:2.5 to 1:7.5, but it is not limited thereto.

As the thickness ratio of the first-A barrier layer and the first-B barrier layer satisfies the above range, there is an effect that long-term reliability such as optical properties, refractive index, and weatherability of a film are improved. If the thickness ratio of the first-A barrier layer and the first-B barrier layer is outside the above range, the refractive index may be decreased, it becomes opaque, or long-term reliability such as optical properties and weatherability may be decreased.

In addition, the second barrier layer comprises a second-A barrier layer and a second-B barrier layer, wherein the thickness ratio of the second-A barrier layer and the second-B barrier layer may be 1:2 to 1:10. In such a case, the second-A barrier layer comprises a metal nitride or a metalloid nitride, and the second-B barrier layer comprises a metal oxide or a metalloid oxide.

The thickness ratio of the second-A barrier layer and the second-B barrier layer may be 1:2.5 to 1:7.5, but it is not limited thereto.

As the thickness ratio of the second-A barrier layer and the second-B barrier layer satisfies the above range, there is an effect that long-term reliability such as optical properties, refractive index, and weatherability of a film are improved. If the thickness ratio of the second-A barrier layer and the second-B barrier layer is outside the above range, the refractive index may be decreased, it becomes opaque, or long-term reliability such as optical properties and weatherability may be decreased.

In an embodiment, the first barrier layer comprises a first-A barrier layer and a first-B barrier layer, wherein the first base layer, the first-A barrier layer, and the first-B barrier layer are sequentially laminated, the first-A barrier layer comprises a metal nitride or a metalloid nitride, and the first-B barrier layer comprises a metal oxide or a metalloid oxide.

In another embodiment, the first barrier layer comprises a first-A barrier layer, a first-B barrier layer, and a first-C barrier layer, wherein the first base layer, the first-A barrier layer, the first-B barrier layer, and the first-C barrier layer are sequentially laminated, the first-A barrier layer comprises a metal nitride or a metalloid nitride, the first-B barrier layer comprises a metal oxide or a metalloid oxide, and the first-C barrier layer comprises an acrylic-based resin, an epoxy-based resin, a silicone-based resin, a polyimide-based resin, or a polyurethane-based resin.

In such a case, the first-A barrier layer may have a thickness of 10 nm to 50 nm, 10 nm to 40 nm, or 10 nm to 30 nm, but it is not limited thereto.

In addition, the first-B barrier layer may have a thickness of 30 nm to 100 nm, 30 nm to 80 nm, 30 nm to 70 nm, or 40 nm to 60 nm, but it is not limited thereto.

The first-A barrier layer and the first-B barrier layer may each have a moisture permeability of 0.2 g/day·m$^2$ or less, 0.15 g/day·m$^2$ or less, or 0.1 g/day·m$^2$ or less, but it is not limited thereto.

As the thickness range and moisture permeability of the first-A barrier layer and the first-B barrier layer satisfy the above ranges, there is an effect that long-term reliability such as optical properties, refractive index, and weatherability of a film are improved. On the other hand, if they are outside the above ranges, the refractive index may be decreased, it becomes opaque, or long-term reliability such as optical properties and weatherability may be decreased.

In an embodiment, the second barrier layer comprises a second-A barrier layer and a second-B barrier layer, wherein the second base layer, the second-A barrier layer, and the second-B barrier layer are sequentially laminated, the second-A barrier layer comprises a metal nitride or a metalloid nitride, and the second-B barrier layer comprises a metal oxide or a metalloid oxide.

In addition, the second barrier layer comprises a second-A barrier layer, a second-B barrier layer, and a second-C barrier layer, wherein the second base layer, the second-A barrier layer, the second-B barrier layer, and the second-C barrier layer are sequentially laminated, the second-A barrier layer comprises a metal nitride or a metalloid nitride, the second-B barrier layer comprises a metal oxide or a metalloid oxide, and the second-C barrier layer comprises an acrylic-based resin, an epoxy-based resin, a silicone-based resin, a polyimide-based resin, or a polyurethane-based resin.

In such a case, the second-A barrier layer may have a thickness of 10 nm to 50 nm, 10 nm to 40 nm, or 10 nm to 30 nm, but it is not limited thereto.

In addition, the second-B barrier layer may have a thickness of 30 nm to 100 nm, 30 nm to 80 nm, 30 nm to 70 nm, or 40 nm to 60 nm, but it is not limited thereto.

The second-A barrier layer and the second-B barrier layer may each have a moisture permeability of 0.2 g/day·m$^2$ or less, 0.15 g/day·m$^2$ or less, or 0.1 g/day·m$^2$ or less, but it is not limited thereto.

As the thickness range and moisture permeability of the second-A barrier layer and the second-B barrier layer satisfy the above ranges, there is an effect that long-term reliability such as optical properties, refractive index, and weatherability of a film are improved. On the other hand, if they are outside the above ranges, the refractive index may be decreased, it becomes opaque, or long-term reliability such as optical properties and weatherability may be decreased.

The moisture permeability of the first barrier layer may be the same as, or different from, that of the second barrier layer. Specifically, the moisture permeability of the first barrier layer may be different from that of the second barrier layer.

The first barrier layer and the second barrier layer may be deposited on the first base layer and the second base layer by a vacuum deposition method, respectively. Specifically, the first barrier layer and the second barrier layer may be deposited on each of the first base layer and the second base layer by a sputtering deposition method.

In such a case, the deposition raw material may be one or more of a metal or a metalloid, and the type thereof is not particularly limited. For example, it may comprise at least one selected from magnesium (Mg), silicon (Si), indium (In), titanium (Ti), bismuth (Bi), germanium (Ge), and aluminum (Al). The deposition reaction gas may comprise oxygen (O$_2$) gas or nitrogen (N$_2$) gas. If oxygen gas is used as the reaction gas, a barrier layer comprising a metal oxide or a metalloid oxide may be formed. If nitrogen gas is used as the reaction gas, a barrier layer comprising a metal nitride or a metalloid nitride may be formed. If oxygen gas and nitrogen gas are appropriately mixed and used as the reaction gas, a barrier layer comprising a metal oxynitride or a metalloid oxynitride may be formed.

The vacuum deposition method includes a physical vacuum deposition method and a chemical vacuum deposition method. The physical vacuum deposition method includes thermal vacuum deposition, E-beam vacuum deposition, and sputtering deposition.

The sputtering may be DC magnetron sputtering or AC magnetron sputtering.

The DC magnetron sputtering may be, specifically, plasma sputtering, for example, reactive plasma sputtering.

As a specific embodiment, the first barrier layer comprises a first-A barrier layer and a first-B barrier layer, wherein the first base layer, the first-A barrier layer, and the first-B barrier layer are sequentially laminated, the first-A barrier layer comprises a silicon nitride (SiNx), and the first-B barrier layer comprises a silicon oxide (SiOx). In addition, optionally, the first barrier layer may further comprise a first-C barrier layer comprising an acrylic-based resin.

When the first-A barrier layer comprises a silicon nitride, the ratio of Si:N may be 1.0:0.8 to 1.0:1.2, but it is not limited thereto. When the first-B barrier layer comprises a silicon oxide, the ratio of Si:O may be 1.0:1.7 to 1.0:2.3, but it is not limited thereto.

In addition, the second barrier layer comprises a second-A barrier layer and a second-B barrier layer, wherein the second base layer, the second-A barrier layer, and the second-B barrier layer are sequentially laminated, the second-A barrier layer comprises a silicon nitride (SiNx), and the second-B barrier layer comprises a silicon oxide (SiOx). In addition, optionally, the second barrier layer may further comprise a second-C barrier layer comprising an acrylic-based resin, an epoxy-based resin, a silicone-based resin, a polyimide-based resin, or a polyurethane-based resin.

When the second-A barrier layer comprises a silicon nitride, the ratio of Si:N may be 1.0:0.8 to 1.0:1.2, but it is not limited thereto. When the second-B barrier layer comprises a silicon oxide, the ratio of Si:O may be 1.0:1.7 to 1.0:2.3, but it is not limited thereto.

As the first barrier layer and the second barrier layer satisfy the above conditions, a desired performance can be achieved even with a thin thickness, and the prevention of moisture penetration can be maximized, whereby the durability and long-term stability of the electrochromic device can be enhanced.

Light Transmission Variable Structure

Figure 4:
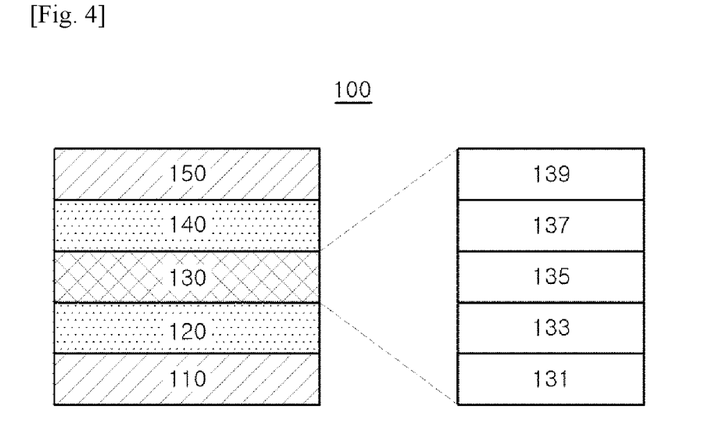
FIG. 4 schematically shows a cross-section of a flexible electrochromic device and a light transmission variable structure according to an embodiment.

The light transmission variable structure (130) comprises a first electrode layer (131); a first chromic layer (133) on the first electrode layer (131); an electrolyte layer (135) on the first chromic layer (133); a second chromic layer (137) on the electrolyte layer (135); and a second electrode layer (139) on the second chromic layer (137) (see FIG. 4).

The light transmission variable structure (130) may be a structure in which a first electrode layer (131), a first chromic layer (133), an electrolyte layer (135), a second chromic layer (137), and a second electrode layer (139) are sequentially laminated. Specifically, the light transmittance variable structure is a laminate structure in which the light transmittance is reversibly changed when a predetermined voltage is applied.

Specifically, when a voltage is applied to the first electrode layer (131) and the second electrode layer (139), the overall light transmittance increases and then decreases due to specific ions or electrons that move from the second chromic layer (137) to the first chromic layer (133) through the electrolyte layer (135).

If the light transmittance of the second chromic layer (137) is decreased, the light transmittance of the first chromic layer (133) is also decreased. If the light transmittance of the second chromic layer (137) is increased, the light transmittance of the first chromic layer (133) is also increased.

The first electrode layer and the second electrode layer may each comprise a transparent electrode or a reflective electrode. In an embodiment, one of the first electrode layer and the second electrode layer may be a transparent electrode, and the other may be a reflective electrode. In another embodiment, both the first electrode layer and the second electrode layer may be transparent electrodes.

The first electrode layer (131) may be formed on the first barrier layer (120) by a sputtering deposition method. In addition, the second electrode layer (139) may be formed on the second barrier layer (140) by a sputtering deposition method.

The transparent electrode may be made of a material having high transmittance of light, low sheet resistance, and penetration resistance, and it may be formed in the shape of an electrode plate.

The transparent electrode, for example, may comprise one selected from the group consisting of indium-tin oxide (ITO), zinc oxide (ZnO), indium-zinc oxide (IZO), and combinations thereof.

The reflective electrode, for example, may comprise at least one selected from the group consisting of silver (Ag), aluminum (Al), copper (Cu), molybdenum (Mo), gold (Au), tungsten (W), chromium (Cr), and combinations thereof.

The first electrode layer (131) and the second electrode layer (139) may each have a thickness of 100 nm to 500 nm, 100 nm to 400 nm, 100 nm to 300 nm, or 150 nm to 250 nm, but it is not limited thereto.

The first electrode layer and the second electrode layer may each be a transparent electrode and comprise indium-tin oxide (ITO).

Specifically, the first electrode layer and the second electrode layer may each comprise indium oxide:tin oxide at a weight ratio of 70:30 to 98:2 or 80:20 to 97:3.

In addition, the first electrode layer and the second electrode layer may each have a surface resistance of 5 Ω/sq to 100 Ω/sq, 5 Ω/sq to 80 Ω/sq, 5 Ω/sq to 70 Ω/sq, or 5 Ω/sq to 50 Ω/sq, but it is not limited thereto.

The first chromic layer (133) is a layer whose light transmittance changes when a voltage is applied between the first electrode layer (131) and the second electrode layer (139). It is a layer that imparts variability of light transmittance to the electrochromic device.

The first chromic layer (133) may comprise at least one layer and, if necessary, may comprise two or more layers of different materials.

The first chromic layer (133) may comprise one or more selected from the group consisting of titanium oxide (TiO), vanadium oxide ($V_2O_5$), niobium oxide ($Nb_2O_5$), chromium oxide ($Cr_2O_3$), manganese oxide ($MnO_2$), iron oxide ($FeO_2$), cobalt oxide ($CoO_2$), nickel oxide ($NiO_2$), rhodium oxide ($RhO_2$), tantalum oxide ($Ta_2O_5$), iridium oxide ($IrO_2$), tungsten oxide ($WO_3$), viologen, and combinations thereof.

The first chromic layer (133) may be formed by depositing a raw material on one side of the first electrode layer (131) by a sputtering method or by applying a raw material by a wet coating method and then drying it. Specifically, the first chromic layer (133) may be formed by applying a raw material to one side of the first electrode layer (131) by a wet coating method and then drying it.

The first chromic layer (133) may have a thickness of 400 nm to 1,000 nm, 500 nm to 900 nm, or 500 nm to 800 nm, but it is not limited thereto.

If the thickness of the first chromic layer satisfies the above range, a change in light transmittance of the light transmission variable structure may impart significant variability of light transmittance to the entire electrochromic device. As a result, the entire electrochromic device may be applied to a window of a building or a car, thereby achieving a light transmission change characteristic capable of producing an energy control effect.

The first electrode layer (131) and the first chromic layer (133) may have an initial transmittance of 90% or more. Specifically, that the initial transmittance satisfies the above range means that each of the above-described layers has been applied very uniformly and is very transparent.

The electrolyte layer (135) is a layer that serves as an ion transport path between the first chromic layer and the second chromic layer. The type of electrolyte used in the electrolyte layer is not particularly limited.

For example, the electrolyte layer may comprise hydrogen ions or Group 1 Element ions. Specifically, the electrolyte layer may comprise a lithium salt compound. The lithium salt compound may be $LiClO_4$, $LiBF_4$, $LiAsF_6$, $LiPF_6$, LiTFSI, LiFSI, or the like, but it is not limited thereto.

In addition, the electrolyte layer may comprise a polymer resin. Specifically, the electrolyte layer may comprise an acrylic-based resin, an epoxy-based resin, a silicone-based resin, a polyimide-based resin, or a polyurethane-based resin, but it is not limited thereto.

Specifically, the acrylic-based resin may be a thermosetting acrylic-based resin, a photocurable acrylic-based resin, or the like. The polyurethane-based resin may be a thermosetting polyurethane-based resin, a photocurable polyurethane-based resin, an aqueous polyurethane-based resin, or the like.

The electrolyte layer may comprise a polymer resin and a lithium salt at a weight ratio of 95:5 to 80:20, 95:5 to 85:15, or 93:7 to 87:3.

The electrolyte layer may have an ionic conductivity of $10^{-5}$ mS/cm or more. Specifically, the ionic conductivity of the electrolyte layer may be $10^{-4}$ mS/cm to $10^3$ mS/cm or $10^{-3}$ mS/cm to $10^2$ mS/cm. Specifically, the ionic conductivity of the electrolyte layer may be 30 μS/cm or more, 40 μS/cm or more, 50 μS/cm or more, 60 μS/cm or more, or 80 μS/cm or more, but it is not limited thereto.

The electrolyte layer may have an adhesive strength of 200 g/inch or more. Specifically, the adhesive strength of the electrolyte layer may be 300 g/inch to 900 g/inch or 450 g/inch to 650 g/inch, but it is not limited thereto.

The electrolyte layer (135) may be formed by applying a raw material to one side of any one of the first chromic layer (133) or the second chromic layer (137) by a wet coating method and then drying it.

If the electrolyte layer is applied by a wet coating method, the thickness of the coating film can be increased or the thickness of the coating film can be easily controlled, which is advantageous from the viewpoint of enhancing ionic conductivity or chromic speed. On the other hand, if a sputtering coating method, rather than a wet coating method, is used for the electrolyte layer, the coating film may be easily broken or the ionic conductivity may be reduced due to the formation of a thin film.

The electrolyte layer (135) may have a thickness of 30 μm to 200 μm, 50 μm to 200 μm, 50 μm to 150 μm, 70 μm to 130 μm, or 80 μm to 120 μm. If the thickness of the electrolyte layer (135) satisfies the above range, durability is imparted to the electrochromic device. At the same time, the transport path of ions between the first chromic layer and the second chromic layer is secured in an appropriate length, whereby an appropriate speed in the light transmission change performance can be achieved.

The second chromic layer (137) is a layer whose light transmittance changes when a voltage is applied between the first electrode layer (131) and the second electrode layer (139). It is a layer that imparts variability of light transmittance to the electrochromic device.

The second chromic layer (137) may comprise at least one layer and, if necessary, may comprise two or more layers of different materials.

The second chromic layer (137) may comprise one or more selected from the group consisting of nickel oxide (e.g., NiO, $NiO_2$), manganese oxide (e.g., $MnO_2$), cobalt oxide (e.g., $CoO_2$), iridium-magnesium oxide, nickel-magnesium oxide, titanium-vanadium oxide, and combinations thereof.

Alternatively, the second chromic layer (137) may comprise a Prussian blue-based pigment, but it is not limited thereto.

The second chromic layer (137) may be formed by depositing a raw material on one side of the second electrode layer (139) by a sputtering method or by applying a raw material by a wet coating method and then drying it. Specifically, the second chromic layer (137) may be formed by applying a raw material to one side of the second electrode layer (139) by a wet coating method and then drying it.

The second chromic layer (137) may have a thickness of 100 nm to 800 nm, 200 nm to 700 nm, or 300 nm to 500 nm, but it is not limited thereto.

If the thickness of the second chromic layer (137) satisfies the above range, an appropriate amount of ions may be retained. At the same time, it may be advantageous for thinning and securing flexibility of an electrochromic device and for achieving excellent light transmission change characteristics.

The second chromic layer (137) has an initial transmittance of 50% or less. Specifically, that the initial transmittance satisfies the above range means that it exhibits a dark blue or pale indigo color when viewed with the naked eye.

The first chromic layer may comprise a material having a color development characteristic complementary to the electrochromic material contained in the second chromic layer. The complementary color development characteristic means that the types of reaction by which the electrochromic materials develop color are different from each other.

For example, if an oxidizing chromic material is used in the first chromic layer, a reducing chromic material may be used in the second chromic layer. If a reducing chromic material is used in the first chromic layer, an oxidizing chromic material may be used in the second chromic layer.

The oxidizing chromic material refers to a material that changes color when an oxidation reaction takes place, and the reducing chromic material refers to a material that changes color when a reduction reaction takes place.

That is, in a chromic layer to which an oxidizing chromic material has been applied, if an oxidation reaction takes place, a coloration reaction would take place; and if a reduction reaction takes place, a decoloration reaction would take place. In a chromic layer to which a reducing chromic material has been applied, if a reduction reaction takes place, a coloration reaction would take place; and if an oxidation reaction takes place, a decoloration reaction would take place.

As such materials having complementary color development characteristics are contained in the respective chromic layers, coloration or decoloration can be simultaneously carried out in both layers. In addition, coloration or decoloration may be alternated according to the polarity of voltage applied to the electrochromic device.

The thickness ratio of the first chromic layer and the second chromic layer may be 50:50 to 80:20, 55:45 to 75:25, or 60:40 to 70:30.

If the thickness ratio of the first chromic layer and the second chromic layer satisfies the above range, there is an effect that the band for color changes between transparency and darkness is wider, and the time for the color changes is shortened. On the other hand, if the above range is not satisfied, the band for color changes between transparency and darkness may be very narrow, and the time for the color changes is prolonged, so that the color may change very slowly, or the electrochromic device may not work even if electricity is applied thereto.

Release Film Layer

Figure 6:
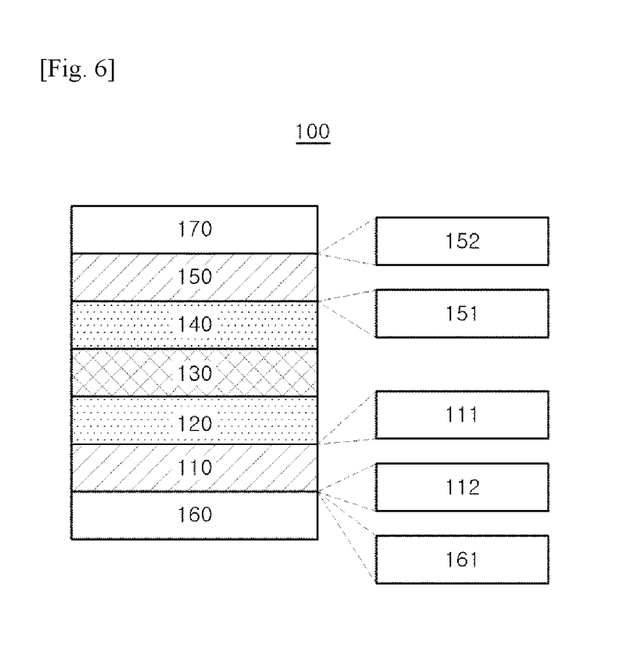
FIG. 6 schematically shows a cross-section of a flexible electrochromic device according to an embodiment.

The flexible electrochromic device (100) according to an embodiment may further comprise a release film layer (160) on the side of the first base layer (110) opposite to the side on which the first barrier layer (120) is laminated (see FIG. 6).

The release film layer (160) may comprise a polyester-based resin comprising polyethylene terephthalate (PET), polyethylene naphthalate (PEN), or polycarbonate (PC).

Specifically, the release film layer may have a thickness of 10 μm to 100 μm, 10 μm to 80 μm, 10 μm to 50 μm, or 12 μm to 50 μm, but it is not limited thereto.

The release film layer has a peel strength of 50 gf/inch or less. Specifically, the peel strength of the release film layer may be 3 gf/inch to 50 gf/inch or 10 gf/inch to 50 gf/inch, but it is not limited thereto.

The release film layer serves to protect the electrochromic device from external moisture or impurities during storage and transport of the electrochromic device. When the electrochromic device is later applied to a transparent window or the like, it may be used after the release film layer is removed, if necessary. The release film layer may particularly prevent a decrease in adhesive strength of the adhesive layer.

An adhesive layer (161) may be formed on one side of the release film layer.

The adhesive layer (161) may comprise an acrylic-based resin, a silicone-based resin, a polyurethane-based resin, an epoxy-based resin, or a polyimide-based resin. Specifically, the adhesive layer may comprise an acrylic resin in which case it is advantageous for enhancing the optical properties and durability.

The adhesive layer may have a blocking rate of UV rays (based on 400 nm) of 95% or more, 97% or more, 98% or more, or 99% or more, but it is not limited thereto.

In addition, the adhesive layer may have an initial adhesive strength of 0.5 N/inch to 8.0 N/inch, 1.0 N/inch to 7.0 N/inch, or 2.0 N/inch to 6.0 N/inch, but it is not limited thereto.

Primer Layer

A primer layer may be laminated on one or both sides of the first base layer (110). Specifically, a first-A primer layer (111) may be laminated on one side of the first base layer (110), and a first-B primer layer (112) may be laminated on the other side (see FIG. 6).

In addition, a primer layer may be laminated on one or both sides of the second base layer (150). Specifically, a second-A primer layer (151) may be laminated on one side of the second base layer (150), and a second-B primer layer (152) may be laminated on the other side (see FIG. 6).

In an embodiment, a primer layer may be interposed between the first barrier layer (120) and the first base layer (110). In addition, a primer layer may be interposed between the second barrier layer (140) and the second base layer (150) (see FIG. 6).

The primer layers (first-A primer layer, first-B primer layer, second-A primer layer, and second-B primer layer) may each comprise an acrylic-based resin, a polyurethane-based resin, a silicone-based resin, or a polyimide-based resin.

The primer layers (first-A primer layer, first-B primer layer, second-A primer layer, and second-B primer layer) may each have a surface tension of 35 dyne/cm² or less or a surface tension of 30 dyne/cm² or less.

The primer layers (first-A primer layer, first-B primer layer, second-A primer layer, and second-B primer layer) may each have an adhesive strength of 3.0 gf/inch or more or an adhesive strength of 3.5 gf/inch or more.

The primer layer serves to impart adhesion between the base layer and the barrier layer or to improve the refractive index. In addition, the material forming the respective primer layers, surface tension, peel strength, and the like may be the same or different.

Hard Coat Layer

The flexible electrochromic device (100) according to an embodiment may further comprise a hard coat layer (170) on the side of the second base layer (150) opposite to the side on which the second barrier layer (140) is laminated (see FIG. 6).

The hard coat layer (170) may comprise an acrylic-based resin, a silicone-based resin, a polyurethane-based resin, an epoxy-based resin, or a polyimide-based resin.

The hard coat layer may have a thickness of 1 μm to 10 μm, 2 μm to 8 μm, 2 μm to 6 μm, or 2 μm to 5 μm, but it is not limited thereto.

The hard coat layer may have a pencil hardness of 3H or higher, 4H or higher, or 5H or higher, but it is not limited thereto.

The hard coat layer serves to protect the electrochromic device from external impacts, and it may impart excellent hardness by virtue of its resistance to scratches.

In addition, as the thickness of the hard coat layer satisfies the above range, it is possible to achieve an electrochromic device having flexibility and excellent workability. If the thickness of the hard coat layer exceeds the above range, it is difficult to achieve flexibility. If the thickness of the hard coat layer is less than the above range, it may be vulnerable to external impacts.

In a specific embodiment, the electrochromic device (100) may comprise a release film layer (160); an adhesive layer (161) on the release film layer (160); a first-B primer layer (112) on the adhesive layer (161); a first base layer (110) on the first-B primer layer (112); a first-A primer layer (111) on the first base layer (110); a first barrier layer (120) on the first-A primer layer (111); a light transmission variable structure (130) on the first barrier layer (120); a second barrier layer (140) on the light transmission variable structure (130); a second-A primer layer (151) on the second barrier layer (140); a second base layer (150) on the second-A primer layer (151); a second-B primer layer (152) on the second base layer (150); and a hard coat layer (170) on the second-B primer layer (152).

Characteristics and Application

The features such as components and properties of each layer of the flexible electrochromic device described above may be combined with each other.

Figure 1:
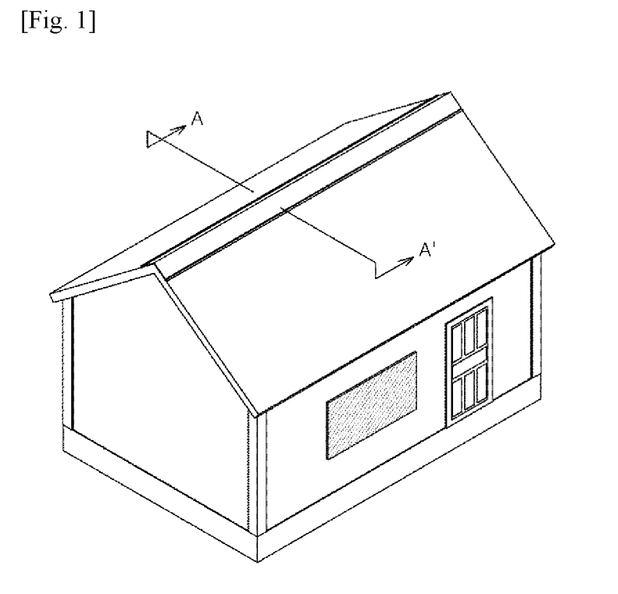
FIG. 1 is a perspective view conceptually showing a window to which a flexible electrochromic device according to an embodiment is applied.
Figure 2:
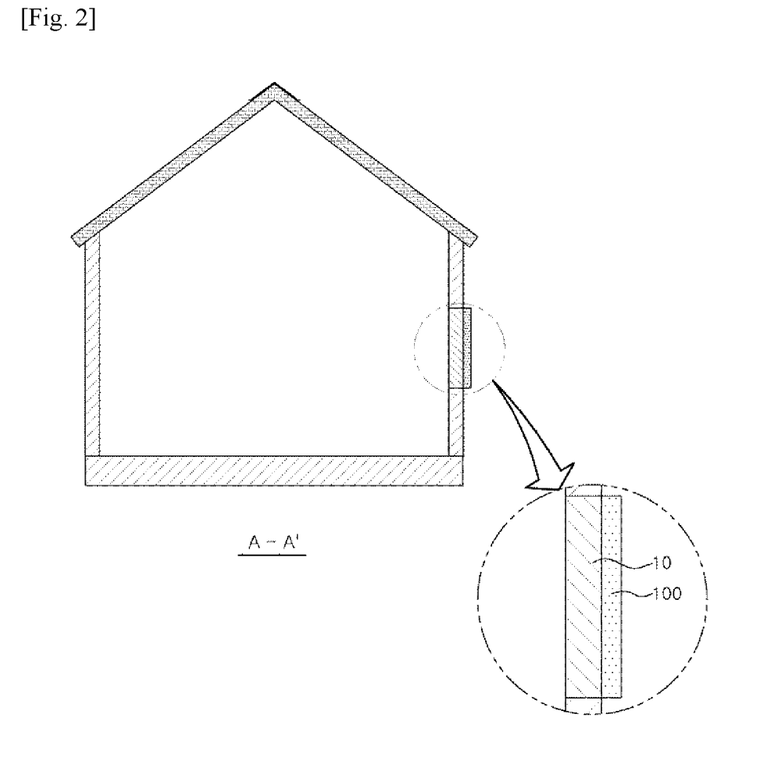
FIG. 2 is a cross-sectional view taken along line A-A' in FIG. 1 and an enlarged view thereof.

The flexible electrochromic device (100) can be applied by simply attaching it to a structure such as a conventional transparent window. For example, as shown in FIG. 1, it may be attached to one side of a window. More specifically, FIG. 2 shows a cross-sectional view taken along line A-A' in FIG. 1 and an enlarged view of the part where the flexible electrochromic device has been applied.

In an embodiment, the flexible electrochromic device (100) may be attached to one side of the window (10), wherein the window (10) may have a flat surface or a curved surface.

In addition, the flexible electrochromic device (100) may be attached to the entire side of the window (10) or may be attached to only a part of the window (10).

In addition, the flexible electrochromic device (100) may be inserted into the window (10). Specifically, the flexible electrochromic device may be applied through a method of interposing it between glass substrates. More specifically, it can be applied in a way in which two polyvinyl butyral (PVB) films are interposed between laminated glasses of a window, and the flexible electrochromic device is interposed between the two PVB films. It can be stably inserted into the window as it tightly attaches by applying heat.

The flexible electrochromic device (100) may have a thickness of 20 μm to 1,000 μm. Specifically, the thickness of the flexible electrochromic device (100) may be 25 μm to 900 μm, 25 μm to 800 μm, 25 μm to 700 μm, 25 μm to 600 μm, or 25 μm to 500 μm, but it is not limited thereto.

The electrochromic device may have a transmittance for visible light of 10% to 40%, 10% to 30%, or 10% to 20%, when decoloration is maximally driven, but it is not limited thereto.

In addition, the electrochromic device may have a transmittance for visible light of 40% to 90%, 50% to 90%, or 60% to 80%, when coloration is maximally driven, but it is not limited thereto.

The electrochromic device may control the transmittance for infrared and ultraviolet rays as well as visible light during coloration and decoloration.

When electric power is applied to the electrochromic device, an electric field is formed between the two electrodes, giving rise to coloration and decoloration, so that the transmittance can be adjusted for each wavelength of sunlight. Thus, an insulation function and a shading function can be advantageously achieved.

In addition, the electrochromic device of a large area can be fabricated at a low cost, and its power consumption is low. Thus, it is suitable for use as a smart window, a smart mirror, or other next-generation architectural window materials.

Since the flexible electrochromic device (100) has a thin thickness and lightweight and flexible characteristics, it has excellent workability, it can be stored in a roll form, and it is convenient to transport.

The invention claimed is:

1. A flexible electrochromic device, which comprises:
a first base layer;
a first barrier layer on the first base layer;
a light transmission variable structure on the first barrier layer;
a second barrier layer on the light transmission variable structure; and
a second base layer on the second barrier layer,
wherein the first barrier layer comprises a first-A barrier layer and a first-B barrier layer,
wherein the second barrier layer comprises a second-A barrier layer and a second-B barrier layer,
wherein one of the first-A barrier layer and the first-B barrier layer comprises a metal oxide or a metalloid oxide, and the other comprises a first metal nitride or a first metalloid nitride,
wherein one of the second-A barrier layer and the second-B barrier layer comprises the metal oxide or the metalloid oxide, and the other comprises a second metal nitride or a second metalloid nitride, and
wherein the moisture permeability of the first barrier layer is different from the moisture permeability of the second barrier layer.

2. The flexible electrochromic device of claim 1, wherein the light transmission variable structure comprises:
a first electrode layer;

a first chromic layer on the first electrode layer;
an electrolyte layer on the first chromic layer;
a second chromic layer on the electrolyte layer; and
a second electrode layer on the second chromic layer.

3. The flexible electrochromic device of claim 1, wherein the first barrier layer further comprises at least one selected from the group consisting of metal oxynitrides, metalloid oxynitrides, and combinations thereof, and the second barrier layer further comprises at least one selected from the group consisting of metal oxynitrides, metalloid oxynitrides, and combinations thereof.

4. The flexible electrochromic device of claim 1,
wherein the thickness ratio of the first-A barrier layer and the first-B barrier layer is 1:2 to 1:10, and the thickness ratio of the second-A barrier layer and the second-B barrier layer is 1:2 to 1:10.

5. The flexible electrochromic device of claim 1, wherein a primer layer is interposed between the first barrier layer and the first base layer, and a primer layer is interposed between the second barrier layer and the second base layer.

6. The flexible electrochromic device of claim 1, which further comprises a hard coat layer on the side of the second base layer opposite to the side on which the second barrier layer is laminated.

7. The flexible electrochromic device of claim 1, wherein the first base layer has a thickness of 10 μm to 300 μm, and the second base layer has a thickness of 10 μm to 300 μm.

* * * * *